(12) United States Patent
Jacob et al.

(10) Patent No.: US 6,824,489 B2
(45) Date of Patent: Nov. 30, 2004

(54) DIFFERENTIAL FOR A MOTOR VEHICLE

(75) Inventors: Werner Jacob, Frankfurt am Main (DE); Erich Kröber, Krottelbach (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/802,689

(22) Filed: Mar. 17, 2004

(65) Prior Publication Data

US 2004/0173042 A1 Sep. 9, 2004

Related U.S. Application Data

(63) Continuation of application No. 09/763,980, filed as application No. PCT/EP99/05885 on Apr. 20, 2001, now abandoned.

(30) Foreign Application Priority Data

Aug. 29, 1998  (DE) .......................................... 198 39 481

(51) Int. Cl.$^7$ .......................... F16H 48/06; F16C 33/60
(52) U.S. Cl. ...................................... 475/247; 384/504
(58) Field of Search .......................... 475/247; 384/504, 384/513, 514, 490, 512, 517–518; 74/424

(56) References Cited

U.S. PATENT DOCUMENTS

| | | | |
|---|---|---|---|
| 1,325,113 A | 12/1919 | Rohn | |
| 1,961,323 A | 6/1934 | Almen | |
| 2,135,477 A | 11/1938 | Griswold | |
| 2,147,144 A | 2/1939 | Carlson et al. | |
| 2,241,606 A | 5/1941 | Kysor | |
| 2,721,486 A | 10/1955 | Nugent | |
| 3,792,625 A | 2/1974 | Asberg | |
| 3,900,232 A | 8/1975 | Rode | |
| 4,261,219 A | 4/1981 | Suzuki et al. | |
| 4,527,443 A | 7/1985 | Ohoka | |
| 4,699,527 A | 10/1987 | Hutzel | |
| 5,226,737 A | 7/1993 | Sandy, Jr. | |
| 5,716,247 A | 2/1998 | Ogino | |
| 2002/0186910 A1 | * 12/2002 | Maret | ................. 384/513 |
| 2004/0109624 A1 | * 6/2004 | Kawaguchi et al. | ........ 384/504 |

FOREIGN PATENT DOCUMENTS

| | | |
|---|---|---|
| DE | 497760 | 5/1930 |
| DE | 2132891 | 1/1973 |
| DE | 3522600 | 1/1987 |
| EP | 206606 | 11/1923 |

* cited by examiner

Primary Examiner—Charles A. Marmor
Assistant Examiner—Dennis J. Abdelnour
(74) Attorney, Agent, or Firm—Volpe and Koenig, P.C.

(57) ABSTRACT

A bevel-pinion shaft (5) of a differential of a motor vehicle is supported in a housing (1) by two spaced unilaterally loadable double-row tandem angular-contact ball bearings (16,17) which face each other in an O-arrangement. Compared to the classical support by conical-roller bearings, a substantially lower frictional moment and substantially lower bearing wear are attained by the bearing arrangement of the present invention.

4 Claims, 2 Drawing Sheets

DIFFERENTIAL FOR A MOTOR VEHICLE

CROSS-REFERENCE TO RELATED APPLICATIONS

This application is a continuation of U.S. application Ser. No. 09/763,980, filed Apr. 20, 2001, which is a 371 National Phase of PCT/EP99/05885, filed Aug. 11, 1999, which are incorporated herein by reference as if fully set forth.

BACKGROUND

The present invention concerns a transfer case or differential with a bevel-pinion shaft which is supported in a drive housing by two spaced and axially pretensioned angular-contact ball bearings and which drives via a bevel pinion and ring gear a differential unit mounted in the drive housing, axle shafts being supported in the differential unit which are operationally connected with each other via output and differential gears.

Such differential gear boxes permit the drive wheels of each axle shaft to roll in slip-free fashion at a different speed of rotation in travelling over a curved path. A bevel-pinion shaft or a drive shaft with a bevel gear drives a ring gear rotationally joined with the differential unit in the interior of which are mounted output and differential gears. While driving straight ahead, these differential gears in the differential unit are at rest so that both axle shafts turn at the same speed of rotation as the ring gear. Upon driving in a curved path, a difference occurs in the speed of rotation of the two axle shafts. In this case, the differential gears rotate and result in the fact that the increase in the speed of rotation of the one axle shaft compared to the speed of rotation of the ring gear is precisely as large as the decrease in the speed of rotation of the other axle shaft compared to the ring gear.

Such a generic differential gear box is described, for example, in the handbook "Roller Bearings—Computation and Design" by W. Hampp, Springer-Verlag Berlin/Heidelberg/New York in Figure 88. The bevel pinion shaft is supported in this case via two spaced conical-roller bearings pretensioned in the axial direction. The pretensioning occurs as a result of the conical-roller bearings being moved toward each other in the axial direction via a threaded connection.

Disadvantageous here is that fact that due to the pretensioning of the conical-roller bearings, sliding friction develops between the end walls of the conical rollers and the edge surface of the bearing rings, which leads to wear of the conical rollers and edge surfaces. This wear, in turn, is responsible for loss in pretensioning of the bearing, as a result of which there occurs an increase in tooth play between the bevel pinion and the ring gear, with its negative consequences.

In connection with this, a differential gear box is known from U.S. Pat. No. 3,792,625, whose bevel-pinion shaft is supported by two spaced apart angular contact ball bearings. Such a bearing arrangement however does not meet the requirements for high performance drives and was therefore not useable from a technical standpoint. For one, the carrier teeth and also the rigidity are too small. Therefore it results in an uneven carrier stopping that lowers the service life of the drive and generates noise when the teeth of the bevel-pinion shaft and the ring gear mesh.

SUMMARY

The present invention is therefore directed to developing an improved bearing arrangement for the bevel-pinion shaft of a differential.

According to the present invention, this problem is solved through the fact that the angular contact ball bearings are designed as unilaterally loadable double-row tandem angular-contact ball bearings, which each include a one piece inner bearing race and a one piece over bearing race and which face each other in an O-arrangement.

The advantages of the solution of the present invention compared to the classical solution with conical-roller bearings are the following:

Due to the substantially reduced frictional moment based on the lack of sliding friction in the bearing arrangement of the present invention, there necessarily also result reduced bearing temperatures and accordingly also a reduced oil-sump temperature. Thus, overall, better efficiency and a lower power loss of the bearing arrangement are attained. Upon installation of the bearing arrangement of the present invention in a motor vehicle, reduced fuel consumption is now possible as a result of the lower power loss. The approximately 40° C. lower temperatures of the oil sump also make it possible that a lighter housing material, for example, a magnesium alloy can be employed for the differential housing which, in turn, makes itself felt in a saving of weight.

A further advantage is a reduced wear of the bearing, which amounts to only about $\frac{1}{10}$ of the wear for the classical solution. This reduced wear accounts for the avoidance of axial shifting of the bevel-pinion shaft along with the known negative increase in tooth play between the bevel pinion on the bevel-pinion shaft and the ring gear connected with the differential unit.

Further advantageous refinements of the solution of the present invention include that the races of a bearing exhibit respectively the same or a different diameter and the same or a different pressure angle.

According to a further feature, the bearing balls of both races of a bearing are guided in cages and have the same or a different diameter.

Preferably, the first double-row tandem angular-contact ball bearing positioned next to the bevel pinion on the bevel-pinion shaft is larger than the accompanying second bearing. This appropriate refinement is undertaken because the greatest loads both in the radial as well as in the axial direction need to be accommodated in the immediate vicinity of the bevel pinion.

Finally, it is preferred that the inner ring of the second double-row tandem angular-contact ball bearing is supported in the axial direction against a deformable sleeve. After adjustment for the desired pretensioning, this sleeve provides for the fact that the adjustment screw is likewise put under pretensioning through the action of a counter force. Spontaneous loosening of this threaded screw is therefore not possible.

The present invention is described in more detail on the basis of the following preferred embodiment.

DETAILED DESCRIPTION OF THE PREFERRED EMBODIMENTS

Figure 1:
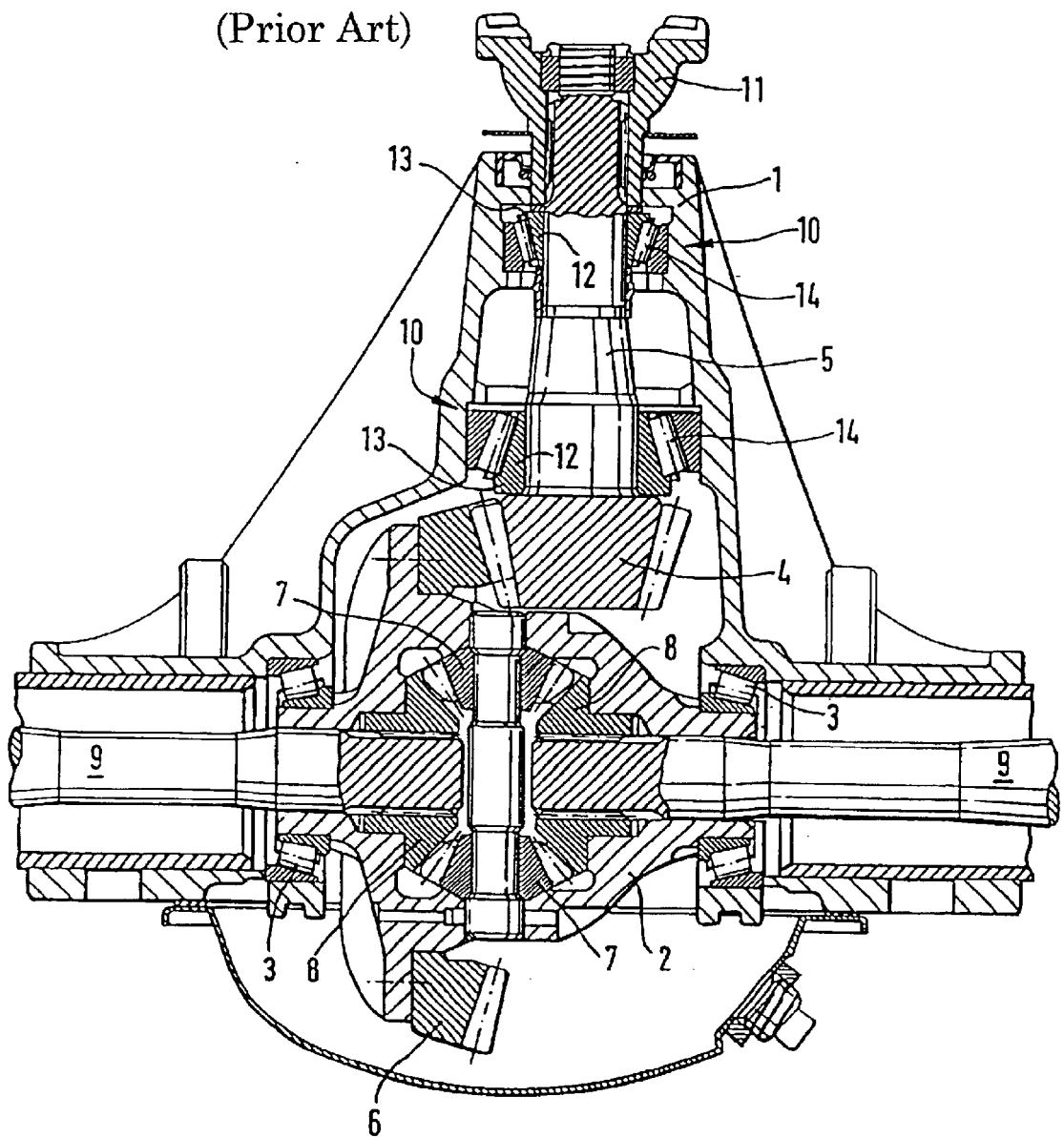
FIG. 1 is a cross-section through a differential of a motor vehicle according to the prior art.

The motor-vehicle differential shown in FIG. 1 includes a housing 1 in which a differential unit 2 is supported via two conical-roller bearings 3. A bevel pinion 4 on a bevel-pinion shaft 5 drives a ring gear 6, which, in turn, sets the differential unit 2 in motion. The differential unit 2 is connected via differential gears 7 and output gears 8 with each of the axle shafts 9, which drive unshown wheels. The bevel-pinion shaft 5 is likewise held in housing 1 via two additional spaced apart conical-roller bearings 10, which are moved toward each other in the axial direction by a threaded piece 11, i.e., put under pretensioning.

The inner rings 12 of conical-roller bearings 10 are provided with a radially outwardly directed edge 13 against which the end wall of conical rollers 14 run. Through the pretensioned conical-roller bearings 10, sliding friction develops between the end walls of conical rollers 14 and the inner surface of edge 13, which leads to wear through removal of material and has a negative effect on the final drive, i.e., such support of the bevel-pinion shaft 5 according to the state of the art involves a high frictional moment, high bearing and oil temperatures, as well as poor efficiency. In addition, the loss in pretensioning developing as a result of the wear of the conical rollers and edge surfaces leads to an increase in tooth play between bevel pinion 4 and ring gear 6.

Figure 2:
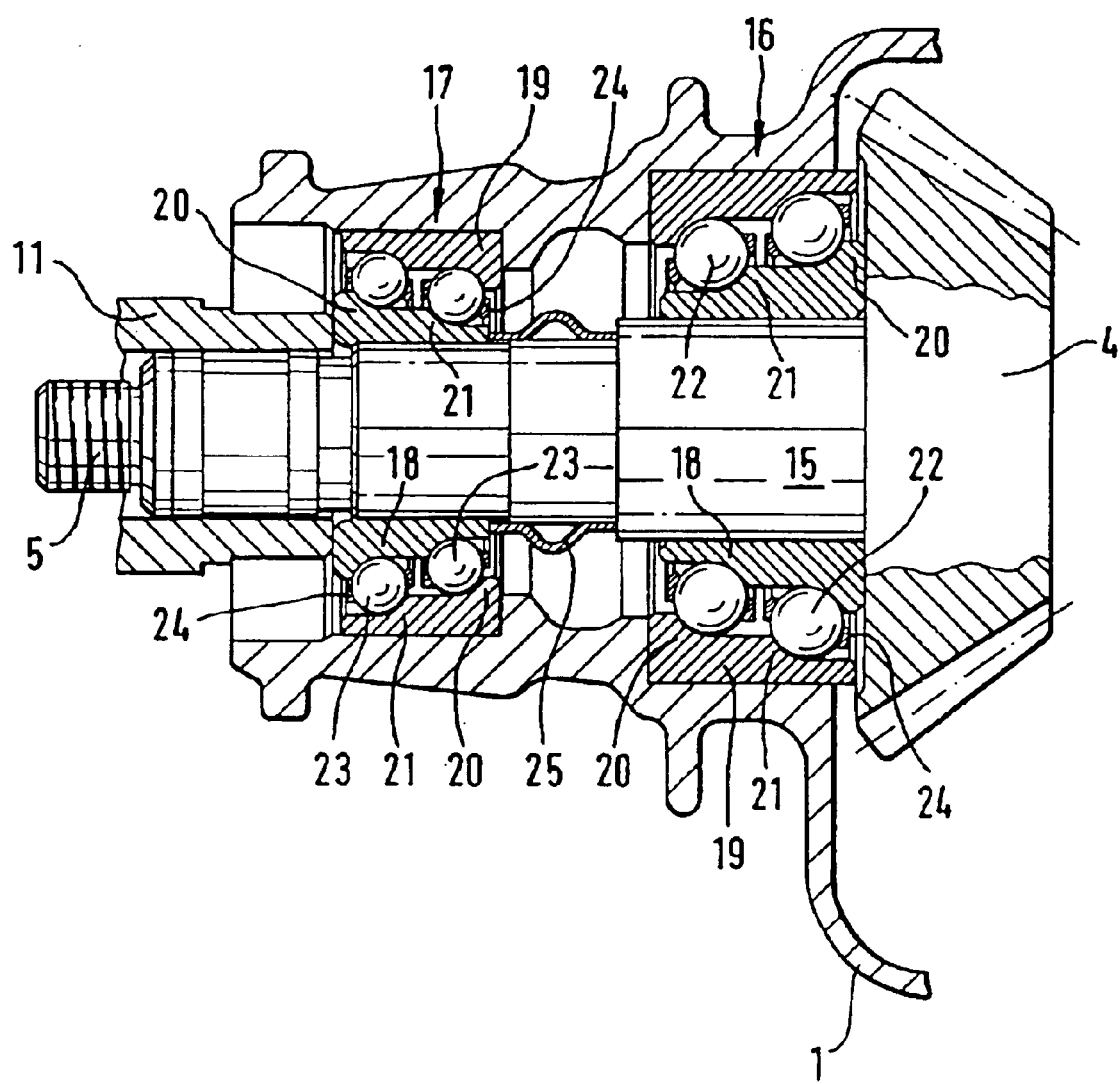
FIG. 2 is a longitudinal cross-section through a bevel-pinion shaft with the bearing arrangement of the present invention.

The bevel-pinion shaft 5 of a differential shown in FIG. 2 includes a stepped shank 15 on whose right-side end lies bevel pinion 4. In housing 1, the bevel-pinion shaft 5 is held by two spaced-apart tandem angular-contact ball bearings 16 and 17 which each include a one-piece bearing inner ring 18 and a one-piece bearing outer ring 19, with each ring having two shoulders 20 and 21. The bearing balls 22 and 23 are of the same size within bearings 16 and 17 and are guided in each case in bearing cages 24. One can further see from the figure that within a given bearing 16 and 17, the not more closely designated races of bearing balls 22 and 23 possess a different diameter. Since the greatest radial and axial stressing of bevel-pinion shaft 5 occurs in the area of bevel pinion 4, tandem angular-contact ball bearing 16 is substantially larger than tandem angular-contact ball bearing 17. As a result of the O-arrangement of the two tandem angular-contact ball bearings 16 and 17 with respect to each other, one ensures that one of bearings 16,17 can accommodate any force in an axial direction, i.e., axial shifting of the bevel-pinion shaft 5 is not possible. The pretensioning is produced in known fashion as a result of the fact that bevel pinion 4 is moved in the direction of housing 1, i.e., axially toward the left by screwing threaded piece 11 onto shank 15 of bevel-pinion shaft 5 so that both bearings 16,17 are put under pretensioning. A sleeve 25 is positioned between bearings 16 and 17 on trunk 15 of bevel-pinion shaft 5. This sleeve is supported, on the one hand, on inner ring 18 of bearing 17 and, on the other hand, on an undesignated step of shank 15. Upon tightening threaded piece 11, the bearing inner ring 18 of bearing 17 is first shifted toward the right so that a deformation force is exerted on sleeve 25, i.e., the latter becomes deformed. As a result of this deformation, however, a counter force is exerted by sleeve 25 on the inner ring 18 of bearing 17 so that threaded piece 11 is loaded with this counter force and can consequently not undergo spontaneous loosening from the threading of the shank 15 of bevel-pinion shaft 5.

In contrast to the classical support of bevel-pinion shaft 5 with conical-rolling bearings 10, only rolling friction is present, and even with relatively strong pretensioning i.e., wear is very greatly reduced.

Element Numbers 1 housing
2 differential unit
3 conical-roller bearing
4 bevel pinion
5 bevel-pinion shaft
6 ring gear
7 differential gear
8 output gear
9 axle shaft
10 conical-roller bearing
11 threaded piece
12 inner ring
13 edge
14 conical roller
15 shank
16 tandem angular-contact ball bearing
17 tandem angular-contact ball bearing
18 inner ring
19 outer ring
20 shoulder
21 shoulder
22 bearing ball
23 bearing ball
24 cage
25 sleeve

What is claimed is:

1. Differential for a motor vehicle, comprising:

a bevel-pinion shaft (5) supported in a drive housing (1) by first and second spaced and axially pretensioned angular contact ball bearings which, through a bevel pinion (4) on the shaft and a ring gear (6), drives a differential unit (2) mounted in the drive housing (1), axle shafts (9) being supported in the differential unit (2) which are operationally connected with each other via output gears (8) and differential gears (7) in the differential unit, the first and second angular-contact ball bearings are unilaterally loadable double-row tandem angular-contact ball bearings (16,17) which each include a one piece inner bearing ring (18) with two outwardly facing races and a one piece outer bearing ring (19) with two inwardly facing races, and balls located in the races, wherein the races of each of the first and second angular-contact ball bearings have different diameters and different pressure angles, whereby the inner bearing ring

(18) and the outer bearing ring (19) of each of the first and second angular-contact ball bearings (16,17) include two shoulders (20,21), each of the races consisting of a single shoulder, the bearings being arranged to face each other in an O-arrangement such that an axially directed load from the bevel pinion to the bevel-pinion shaft is transferred from the shoulders of the inner race of the first bearing, which is located adjacent to the bevel pinion, through the balls to the outer race of the first bearing which is seated in the drive housing, and an oppositely directed axial load on the bevel-pinion shaft from a drive shaft connected end is transferred from the shoulders of the inner race of the second bearing through the balls to the outer race of the second bearing which is seated in the drive housing, and the inner ring (18) of the second double-row tandem angular-contact ball bearing (17) is supported in an axial direction with a deformable sleeve (25) acting against an end of a shank (15) of the bevel-pinion shaft (5), and a threaded piece (11) is located on an end of the bevel-pinion shaft so that both of the angular contact ball bearings can be pre-tensioned by adjusting the single threaded piece (11) on the bevel-pinion shaft.

2. The differential of claim 1, wherein the deformable sleeve has a smaller diameter than an inner diameter of the first bearing, allowing the bevel pinion shaft to be drawn toward the threaded piece to pre-load both of the angular contact ball bearings by movement of the inner races towards each other.

3. The differential of claim 2, wherein the first bearing has a larger diameter than the second bearing, and the balls of the first bearing all have a first, larger diameter than the balls of the second bearing, the balls of the first bearing being generally equally pre-loaded by the pre-tensioning and the balls of the second bearing being generally equally pre-loaded.

4. The differential of claim 1, wherein the angular contact ball bearings each include two bearing cages to maintain the balls in position, the cages being spaced axially inwardly from a respective axial end of each of the angular contact ball bearings to allow pre-tensioning of the bearings without loading the bearing cages.

* * * * *